United States Patent
Zhu

(10) Patent No.: US 12,425,508 B2
(45) Date of Patent: Sep. 23, 2025

(54) METHOD FOR REALIZING STABLE DISPLAY OF 5G SIGNAL

(71) Applicant: JRD COMMUNICATION (SHENZHEN) LTD., Guangdong (CN)

(72) Inventor: Yuejun Zhu, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 435 days.

(21) Appl. No.: 17/996,785

(22) PCT Filed: May 28, 2020

(86) PCT No.: PCT/CN2020/092893
§ 371 (c)(1),
(2) Date: Oct. 20, 2022

(87) PCT Pub. No.: WO2021/212606
PCT Pub. Date: Oct. 28, 2021

(65) Prior Publication Data
US 2023/0156114 A1    May 18, 2023

(30) Foreign Application Priority Data
Apr. 21, 2020   (CN) .......................... 202010315915.7

(51) Int. Cl.
*H04W 48/18*    (2009.01)
*H04M 1/72448*    (2021.01)
(Continued)

(52) U.S. Cl.
CPC ....... *H04M 1/72448* (2021.01); *H04W 36/18* (2013.01); *H04W 36/00698* (2023.05); *H04W 88/06* (2013.01)

(58) Field of Classification Search
CPC ............. H04M 1/72448; H04W 36/18; H04W 36/00698; H04W 88/06; H04W 48/18
See application file for complete search history.

(56) References Cited

U.S. PATENT DOCUMENTS 10,834,774 B1 *  11/2020  Haberman ............ H04W 16/32
2018/0368016 A1   12/2018  Lee et al.
(Continued)

FOREIGN PATENT DOCUMENTS

CN    107197507 A    9/2017
CN    108029152 A    5/2018
(Continued)

OTHER PUBLICATIONS

European Search Report in European application No. 20931921.9, mailed on Apr. 25, 2024.
(Continued)

*Primary Examiner* — Angelica Perez
(74) *Attorney, Agent, or Firm* — PV IP PC; Wei Te Chung

(57) ABSTRACT

A method for realizing stable display of a 5G signal includes when a master node is switched and a secondary cell group bearer is released in a dual-connectivity network, starting a first timer and displaying the 5G signal; when it is determined that the first timer expires and it is detected that a radio resource control is in an idle state, starting a second timer and displaying the 5G signal; when it is determined that the second timer expires and it is detected that the radio resource control is in a connected state, querying a number of data radio bearers and displaying a signal type according to the number of data radio bearers; and when it is detected that the radio resource control is in the idle state, querying an information database of a 5G cell and displaying the signal type according to information of the 5G cell.

20 Claims, 4 Drawing Sheets

(51) Int. Cl.
*H04W 36/18* (2009.01)
*H04W 36/00* (2009.01)
*H04W 88/06* (2009.01)

(56) References Cited

U.S. PATENT DOCUMENTS

| | | |
|---|---|---|
| 2019/0069229 A1 | 2/2019 | Lee et al. |
| 2020/0037387 A1* | 1/2020 | Lee ................ H04W 48/16 |
| 2020/0068456 A1 | 2/2020 | Humbert et al. |
| 2020/0068482 A1 | 2/2020 | Lu |
| 2020/0068638 A1* | 2/2020 | Au ................ H04W 48/16 |
| 2020/0100181 A1* | 3/2020 | Jia ................ H04W 48/12 |
| 2021/0282126 A1* | 9/2021 | Lekutai ............. H04W 4/029 |
| 2021/0307096 A1* | 9/2021 | Lee ................ H04W 76/18 |

FOREIGN PATENT DOCUMENTS

| | | |
|---|---|---|
| CN | 108366437 A | 8/2018 |
| CN | 110247671 A | 9/2019 |
| CN | 110351741 A | 10/2019 |
| CN | 110545565 A | 12/2019 |
| CN | 110677867 A | 1/2020 |
| CN | 110691392 A | 1/2020 |
| CN | 110839106 A | 2/2020 |
| IN | 110784897 A | 2/2020 |
| WO | 2020042181 A1 | 3/2020 |

OTHER PUBLICATIONS

International Search Report in International application No. PCT/CN2020/092893, mailed on Jan. 22, 2021.
Written Opinion of the International Search Authority in International application No. PCT/CN2020/092893, mailed on Jan. 22, 2021.
Chinese Office Action issued in corresponding Patent Application No. 202010315915.7 dated Jan. 5, 2021, pp. 1-7.
Notification to Grant Patent Right for Invention issued in corresponding Patent Application No. 202010315915.7 dated Apr. 29, 2021, pp. 1-4.
Author: Hang Ruan , Abstract of "Research and analysis of terminal 5G logo display scheme", Aug. 23, 2018.

* cited by examiner

METHOD FOR REALIZING STABLE DISPLAY OF 5G SIGNAL

CROSS REFERENCE

The present disclosure is a US national phase application based upon an International Application No. PCT/CN2020/092893, filed on May 28, 2020, which claims the priority of Chinese Patent Application No. 202010315915.7, entitled "METHOD FOR REALIZING STABLE DISPLAY OF 5G SIGNAL", filed on Apr. 21, 2020, the disclosure of which is incorporated herein by reference in its entirety.

FIELD OF THE DISCLOSURE

The present disclosure relates to the field of wireless communication technologies, in particular, to a method for realizing stable display of a 5G signal.

BACKGROUND 5G is a new generation of mobile communication technology. There are two network schemes, NSA (non-standalone network) and SA (standalone network). There is a clear difference between the two. The NSA (non-standalone network) network is deployed on the existing 4G infrastructure, and some services and functions continue to rely on the 4G network. The advantage is that it can save construction costs and achieve rapid coverage. NSA transmits 5G signals by transforming 4G base stations. The early laying speed is fast, and the cost is low. It can make 5G popular as soon as possible and let as many users as possible enjoy it. However, SA needs to build an independent base station, and the time cost required to achieve large-scale coverage is relatively high, SA has the characteristics of higher speed and lower delay. In the future, in the process of developing to SA, NSA may definitely have a long transition period. Therefore, the NSA network is the first choice for most operators to consider in the early stage of 5G network construction. That is, before the SA network is fully covered, the NSA network may exist in the existing network for a long time and coexist with the SA network. This also means that NSA/SA dual mode may be the mainstream trend in the industry. Therefore, in the future dual-mode 5G era, dual-mode 5G mobile phones can provide a more complete 5G network experience.

Most of the 5G networks currently deployed are NSA eMBB networks, relying on mature LTE network coverage, and at the same time taking advantage of a high throughput of gNB (5G base station) in dual-connectivity ENDC. In order to distinguish it from the LTE network, it is necessary to display the current network as 5G on UI (user equipment) interface when a terminal is connected to the ENDC (5G ENDC system architecture shown in FIG. 1) network. In the 4G network, RRC (radio resource control) is released, and 4G is still displayed, but there is no RRC control link between the gNB and the terminal in the ENDC network. Therefore, the release of the RRC connection of LTE may lead to the release of SCG. During the movement of the terminal, the network environment is constantly changing. If the user is using a 5G mobile phone at this time, but the RRC of LTE becomes idle (idle state), the UI may be displayed as 4G. The user may find that the 5G signal is unstable, changing frequently between 4G and 5G. This leads the user to believe that the terminal 5G signal is poor, and the user may complain to terminal manufacturers or operators, which may have a certain impact on product quality and brand reputation.

SUMMARY

Technical Problem

Embodiments of the present disclosure provide a method for realizing stable display of a 5G signal, which can solve an issue of unstable display of the 5G signal during a movement of a terminal caused by changes in a network environment.

Technical Solution

The embodiment of the present disclosure provides a method for realizing stable display of a 5G signal, comprising:
  when a master node is switched and a secondary cell group bearer is released in a dual-connectivity network, starting a first timer and displaying the 5G signal;
  when it is determined that the first timer expires and it is detected that a radio resource control is in an idle state, starting a second timer and displaying the 5G signal;
  when it is determined that the second timer expires and it is detected that the radio resource control is in a connected state, querying a number of at least one data radio bearer and displaying a signal type according to the number of the at least one data radio bearer; and
  when it is detected that the radio resource control is in the idle state, querying an information database of a 5G cell and displaying the signal type according to information of the 5G cell.

In the method for realizing stable display of the 5G signal, when the master node is switched and the secondary cell group bearer is released in the dual-connectivity network, the method of starting the first timer and displaying the 5G signal further comprises:
  when it is determined that the first timer expires and it is detected that the radio resource control is in the connected state, querying the number of the at least one data radio bearer and displaying the signal type according to the number of the at least one data radio bearer.

In the method for realizing stable display of the 5G signal, the method of querying the number of the at least one data radio bearer comprises:
  the at least one data radio bearer comprising a primary cell group bearer and the secondary cell group bearer; and
  a primary cell group being a 4G cell, and a secondary cell group being a 5G cell.

In the method for realizing stable display of the 5G signal, wherein when it is detected that the radio resource control is in the connected state, the method of querying the number of the at least one data radio bearer and displaying the signal type according to the number of data radio bearers comprises:
  when the number of the at least one data radio bearer is 1, displaying a 4G signal; and
  when the number of the at least one data radio bearer is 2, displaying the 5G signal.

In the method for realizing stable display of the 5G signal, when it is detected that the radio resource control is in the idle state, the method of querying the information database of the 5G cell and displaying the signal type according to the information of the 5G cell comprises:

when it is determined that a primary cell group supports the dual-connectivity network and the information database of the 5G cell comprises a system information of a group of 5G cells, starting a third timer and displaying the 5G signal; and when it is determined that the primary cell group supports a single-connectivity network and the information database of the 5G cell is empty, displaying a 4G signal.

In the method for realizing stable display of the 5G signal, the method of starting the third timer and displaying the 5G signal comprises:

when it is determined that the third timer expires, querying the number of the at least one data radio bearer and displaying the signal type according to the number of the at least one data radio bearer.

In the method for realizing stable display of the 5G signal, the method of querying the number of the at least one data radio bearer and displaying the signal type according to the number of the at least one data radio bearer comprises:

when the number of the at least one data radio bearer is less than 2, displaying the 4G signal; and when the number of the at least one data radio bearer is 2, displaying the 5G signal.

In the method for realizing stable display of the 5G signal, when the master node is switched and the secondary cell group bearer is released in the dual-connectivity network, the method comprises:

when a user equipment switches a primary cell group, enabling a measurement control through a reconfiguration message of the radio resource control; and when it is determined that the primary cell group supports the dual-connectivity network, adding a secondary cell group through the reconfiguration message of the radio resource control.

In the method for realizing stable display of the 5G signal, the method of adding the secondary cell group through the reconfiguration message of the radio resource control comprises:

acquiring a system information of the secondary cell group, wherein when the system information of the secondary cell group is inconsistent with a system information stored in the information database of the 5G cell, updating the information database of the 5G cell to the system information of the secondary cell group.

In the method for realizing stable display of the 5G signal, when the system information of the secondary cell group is inconsistent with the system information stored in the information database of the 5G cell, the method comprises:

the system information of the secondary cell group comprising a physical cell identification and a frequency.

Advantageous Effect

In the embodiment of the present disclosure, when a master node is switched and a secondary cell group bearer is released in a dual-connectivity network, starting a first timer and displaying the 5G signal; when it is determined that the first timer expires and it is detected that a radio resource control is in an idle state, starting a second timer and displaying the 5G signal; when it is determined that the second timer expires and it is detected that the radio resource control is in a connected state, querying a number of at least one data radio bearer and displaying a signal type according to the number of the at least one data radio bearer; and when it is detected that the radio resource control is in the idle state, querying an information database of a 5G cell and displaying the signal type according to information of the 5G cell. Therefore, time of the timer in this solution can be adjusted flexibly, and a signal icon can be updated more efficiently and timely by using multiple timers. By determining the number of the at least one data radio bearer and the information of the 5G cell, in the continuously changing environment of the network, a smooth processing of the 5G signal can allow a user to better experience 5G.

DETAILED DESCRIPTION

Figure 1:
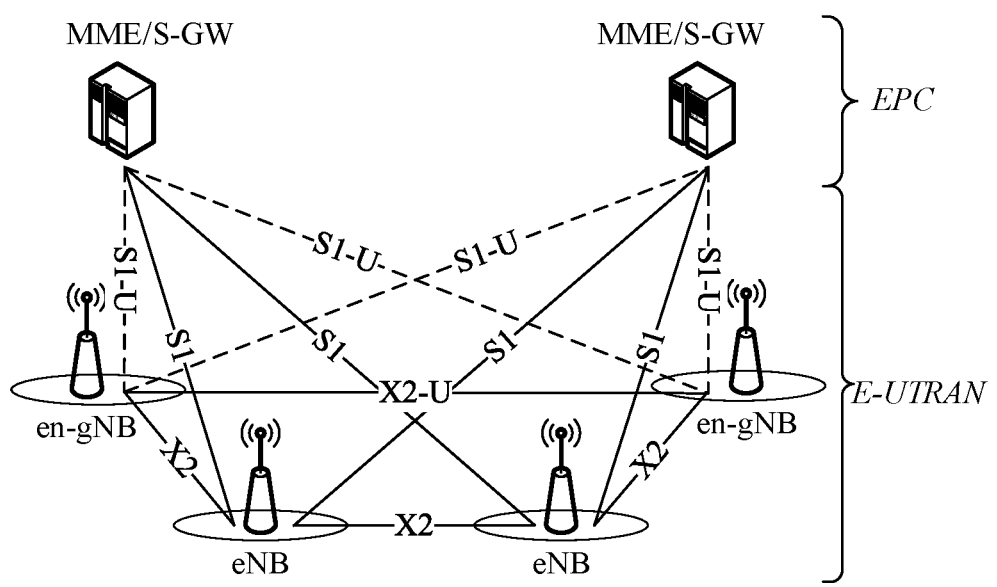
FIG. 1 is a schematic diagram of a 5G ENDC system architecture in the background art of an embodiment of the present disclosure.

In the initial access process of ENDC, MN (MN: master node, eNB plays the role of MN in the ENDC network) checks that: If the current terminal is allowed to access the dual-connectivity network, the MN sends the event of measurement configuration and measurement report. When the terminal measures that the 5G neighbor cell of LTE meets the B1 event and reports the measurement configuration to the MN, the MN notifies the SN (SN: secondary node, the gNB in the ENDC network plays the role of the SN). The current UE meets the access conditions, such that the SN sends the SN's RRC reconfiguration and bearer configuration messages to the MN through the X2 interface, and the MN packages and sends them to the terminal (in the ENDC network, there is no RRC connection between the terminal and the gNB, and the NR air interface control message still passes through LTE cell for delivery). According to the delivered SN network configuration, the terminal receives the SN's MIB (master information block) message on the channel and tries to initiate the RACH random access process. If the result returned to the RACH is successful, it indicates that the terminal has successfully accessed the SN network (5G secondary cell) of the 5G NR.

Specification TS38.331 5.7.3.3 defines several types of SCG Failure. The MCG (primary cell group) may issue an RRC reconfiguration to release the SCG (secondary cell group). When the RRC is successfully rebuilt, it may decide whether to add an SCG again according to the neighboring cells. Under the dual-connectivity network, the terminal may decide whether to display 5G according to the 5G signal display algorithm. Under the premise that the terminal displays 5G, the SCG may be released in case of network abnormality or no data transmission. NSA network cell handover results in SCG release, and then re-establishing the SCG includes the following situations: MN handover and accompanied by SN change. MN handover with SN unchanged. MN handover, accompanied by SN change. MN handover, with SN addition (original LTE single connection, or handover from other RAT to MN). MN handover, accompanied by SN release. The primary node is represented by MN, and the secondary node is represented by SN.

When the terminal has no data service, the network timer may automatically release the RRC connection of the MCG after the network timer expires, such that the SCG may be released. When the terminal releases the SCG bearer, it is generally determined by a single timer at present. That is, after the network releases the SCG bearer, the timer is started. If the dual-connectivity has not been established after the timer expires (that is, the SCG has not been added), it may be displayed as 4G. If the timer time is set too long, it may not truly reflect the network registration situation. If the timer time is set too short, the signal may change frequently, such as the signal hopping process of 5G->4G->5G. Therefore, in the embodiment of the present disclosure, three timers are set to determine the 5G signal in sequence.

The embodiment of the present disclosure provides a method for realizing stable display of a 5G signal, comprising: when a master node is switched and a secondary cell group bearer is released in a dual-connectivity network, starting a first timer and displaying the 5G signal; when it is determined that the first timer expires and it is detected that a radio resource control is in an idle state, starting a second timer and displaying the 5G signal; when it is determined that the second timer expires and it is detected that the radio resource control is in a connected state, querying a number of at least one data radio bearer and displaying a signal type according to the number of the at least one data radio bearer; and when it is detected that the radio resource control is in the idle state, querying an information database of a 5G cell and displaying the signal type according to information of the 5G cell.

Figure 2:
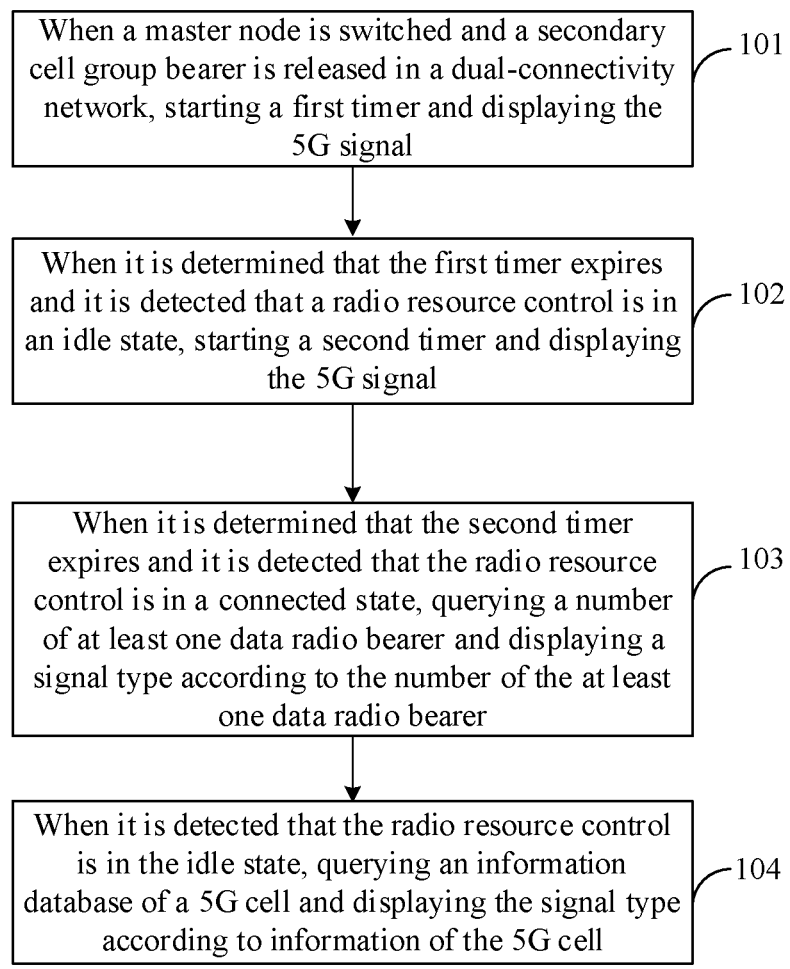
FIG. 2 is a schematic flowchart of a method for realizing stable display of a 5G signal provided by an embodiment of the present disclosure.

As shown in FIG. 2, the specific process of the method for realizing stable display of a 5G signal may be as follows:

101: When a master node is switched and a secondary cell group bearer is released in a dual-connectivity network, starting a first timer and displaying the 5G signal.

For example, in a dual-connectivity network, during the movement of a user terminal, the NSA cell handover may result in the release of the SCG bearer. In this case, a first timer T1 is started, and a terminal interface continues to display the 5G signal.

If the first timer T1 does not expire and the dual connectivity is re-established, the terminal interface continues to display the 5G signal.

102: When it is determined that the first timer expires and it is detected that a radio resource control is in an idle state, starting a second timer and displaying the 5G signal.

For example, after determining that the first timer T1 has expired, a state of the RRC is detected. If the RRC is in an idle state, that is, the dual connectivity has not been established. In this case, the second timer T2 is started, and the terminal interface continues to display the 5G signal.

After determining that the first timer T1 has expired, the state of the RRC is detected. If the RRC is in a connected state, the number of data radio bearers (DRBs) is queried at this case, and the signal type is displayed according to the number of DRBs. If the number of DRB queried is 1, that is, there is only one DRB bearer at this case, the terminal interface displays the 4G signal. If the number of DRBs queried is 2, that is, there are two DRB bearers at this case, and the SCG addition is completed, the terminal interface displays the 5G signal.

The data radio bearer includes a primary cell group bearer and a secondary cell group bearer. The primary cell group bearer is a 4G cell, and the secondary cell group bear is a 5G cell. The terminal can know whether there is currently an SCG network connection according to whether there are two DRB bearers currently.

Database 1 (drb_db) stores a list of DRBs locally in the modem and updates the database 1 in time according to network changes of SCG and MCG. When the drb-identity contained in the drb-ToAddModList field in the RRC reconfiguration message is different from the DRB bearer index of LTE, it is added to the database 1. When the drb-identity contained in the drb-ToRelelaseList in the RRC reconfiguration message is the same as the DRB bearer index of the NR, it is deleted from the database 1. In addition to storing the DRB list, the database 1 also stores a field num of the number of DRBs, which is used to record the total number of DRBs in the current database.

103: When it is determined that the second timer expires and it is detected that the radio resource control is in a connected state, querying a number of at least one data radio bearer and displaying a signal type according to the number of the at least one data radio bearer.

For example, after determining that the second timer T2 expires, the state of the radio resource control is detected. If the radio resource control is in the connected state, the number of DRBs is queried at this case, and the signal type is displayed according to the number of DRBs. If the number of DRBs queried is 1, that is, there is only one DRB bearer at this case, the terminal interface displays the 4G signal. If the number of DRBs queried is 2, that is, there are two DRB bearers at this case, the SCG addition is completed, and the terminal interface displays the 5G signal.

If the second timer T2 does not expire and the dual connectivity is re-established, the terminal interface continues to display the 5G signal.

104: When it is detected that the radio resource control is in the idle state, querying an information database of a 5G cell and displaying the signal type according to information of the 5G cell.

If the second timer T2 does not expire and the dual connectivity is re-established, the terminal interface continues to display the 5G signal.

When the RRC is in an idle state, the target cell to which the re-selected cell is triggered, that is, if the reselected MCG cell supports the dual connectivity network, the information database of the 5G cell is queried. If the information database of the 5G cell contains MIB messages of a group of 5G cells, the third timer T3 is started, and the terminal interface displays the 5G signal.

It is determined whether the third timer T3 has expired, and if it is determined that the third timer T3 has expired, the number of DRBs at this case is queried, and the data type is displayed according to the number of DRBs. If the number of queried DRBs is 0, that is, the RRC is in an idle state at this case, the terminal interface displays a 4G signal. If the number of DRB queried is 1, that is, the RRC is in the connected state and there is only one DRB bearer, the terminal interface displays the 4G signal. If the number of DRBs queried is 2, that is, the RRC is in the connected state, there are two DRB bearers, and the SCG is added, the terminal interface displays the 5G signal.

When the RRC is in the idle state, the target cell to which the re-selected cell is triggered, that is, when the re-selected MCG cell does not support the dual-connectivity network, the information database of the 5G cell is empty, and the terminal interface displays the 4G signal.

Each time the user equipment accesses an MCG cell, the network may issue a measurement control through an RRC reconfiguration message. If the cell of the MCG supports the dual-connectivity network, it may continue to deliver the RRC reconfiguration message to add the SCG. Before random access, the MIB message of the 5G cell is obtained, and the PCI (physical cell identifier) and frequency included are cached first. If the RACH (random access channel) succeeds, the values of these two contents are stored in the information database of the 5G cell (nrinfo_db), which can only store one set of data. If the MCG cell has not changed, even if the RRC is released, the information database of the 5G cell may not be updated. After cell reselection, if the upperLayerindication field in the system message is true, that is, the dual-connectivity network is supported, and when the frequency and PCI in the MIB message of the 5G cell are inconsistent, the information database of the 5G cell is updated to the acquired content value. If there is no 5G cell information in the new measurement and control information, the information database of the 5G cell is cleared. After cell reselection, if the upperLayerindication field in the system message is false, that is, if the dual-connectivity network is not supported, the information database of the 5G cell may be cleared.

If the third timer T3 does not expire and the dual connectivity is re-established, the terminal interface continues to display the 5G signal.

The time setting of each timer can be customized and adjusted, and the sum of the time of the three timers generally does not exceed 25 seconds.

Figure 3:
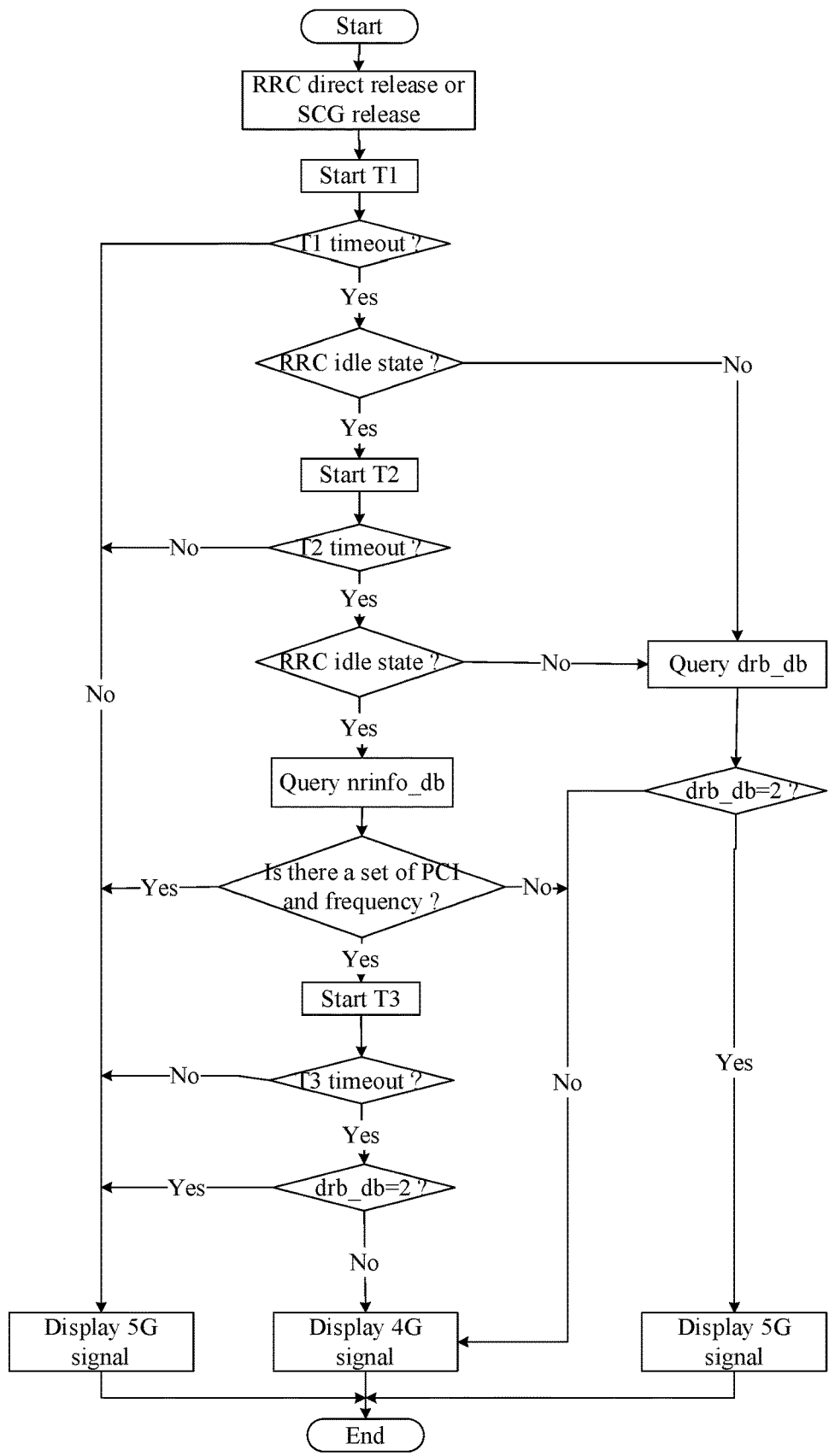
FIG. 3 is a working flowchart of a method for realizing stable display of a 5G signal provided by an embodiment of the present disclosure.

As shown in FIG. 3, an embodiment of the present disclosure provides a working flowchart of a method for realizing stable display of a 5G signal.

Refer to FIG. 3, under the dual-connectivity network, the terminal is moving, after the RRC is directly released or the SCG is released, the first timer T1 is started, and the terminal device continues to display the 5G signal. Then, determine whether T1 times out. If T1 does not expire and the dual connectivity is re-established, the terminal displays the 5G signal. If T1 times out, check the state of RRC. If the RRC is in the connected state, query the number of DRBs at this case and display the signal type according to the number of DRBs. If the number of DRB queried is 1, that is, there is only one DRB bearer at this case, the terminal interface displays the 4G signal. If the number of DRBs queried is 2, that is, there are two DRB bearers at this case, and the SCG is added, the terminal interface displays the 5G signal. If the RRC is in an idle state, that is, the dual connectivity has not been established, at this case, the second timer T2 is started, and the terminal interface continues to display the 5G signal.

Then it is determined whether the second timer T2 has expired. If the second timer T2 has not expired and the dual connectivity is re-established, the terminal interface continues to display the 5G signal. If it is determined that the second timer T2 expires, the state of the RRC is detected. If the RRC is in the connected state, the number of DRBs is queried at this case, and the signal type is displayed according to the number of DRBs. If the number of DRB queried is 1, that is, there is only one DRB bearer at this case, the terminal interface displays the 4G signal. If the number of DRBs queried is 2, that is, there are two DRB bearers at this case, and the SCG addition is completed, the terminal interface displays the 5G signal. If the RRC is in the idle state, query the information database of the 5G cell and display the signal type according to the 5G cell information. If the information database of the 5G cell is empty, the terminal interface displays the 4G signal. If the information database of the 5G cell contains MIB messages of a group of 5G cells, the third timer T3 is started, and the terminal interface displays the 5G signal.

Finally, it is determined whether the third timer T3 has expired, and if it is determined that the third timer T3 has expired, the number of DRBs at this case is queried, and the data type is displayed according to the number of DRBs. If the number of DRBs queried is 2, that is, the RRC is in the connected state, there are two DRB bearers, and the SCG is added, the terminal interface displays the 5G signal. If the number of queried DRBs is not 2, no matter what the RRC state is at this case, the terminal interface displays the 4G signal.

Figure 4:
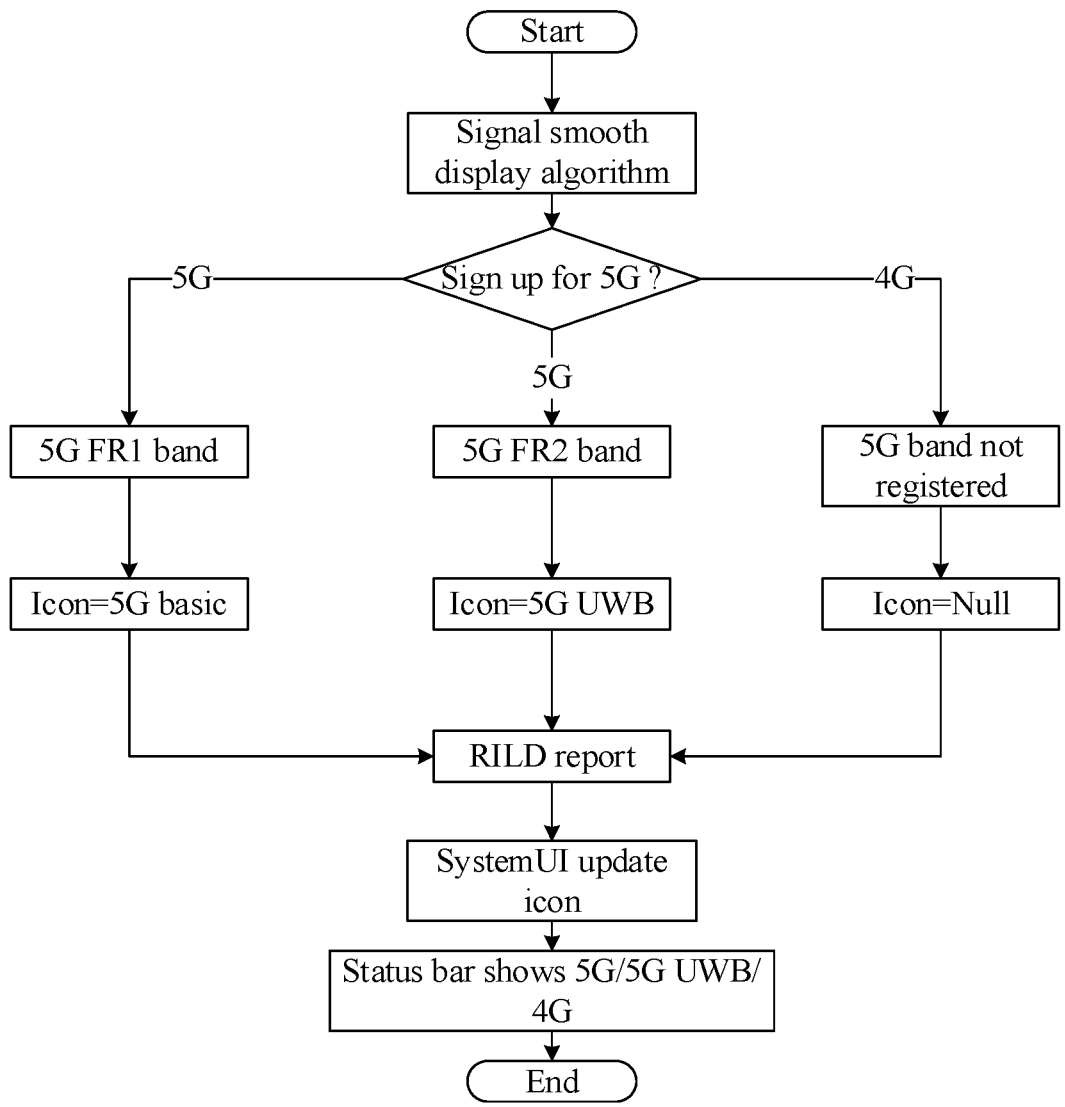
FIG. 4 is a schematic flowchart of a 5G signal classification report provided by an embodiment of the present disclosure.

As shown in FIG. 4, an embodiment of the present disclosure provides a schematic flowchart of a 5G signal classification report. After the terminal executes the above method for realizing stable display of the 5G signal, the terminal obtains the current 5G state and then classifies and reports signal icons according to the three cases of the registered frequency band being FR1/FR2/only 4G. The terminal registers the FR1 frequency band, and the report shows 5G basic (baseband), and the terminal registers the FR2, the report shows 5G UWB (ultra-wideband). If the terminal is not registered with 5G, it may report Null. RILD decides whether to display 5G according to the reported mask and transmits it to the UI system through the interface on the AP side to update the signal icon.

In order to better implement the above method, an embodiment of the present disclosure may further provide a device for realizing stable display of a 5G signal, and the device for realizing stable display of the 5G signal is applied to a terminal equipment.

Figure 5:
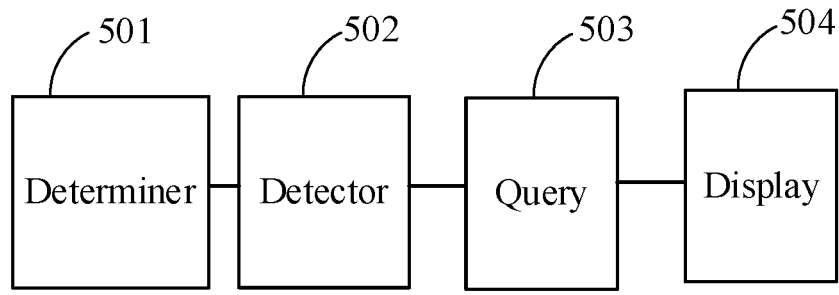
FIG. 5 is a schematic flowchart of a device for realizing stable display of a 5G signal provided by an embodiment of the present disclosure.

For example, as shown in FIG. 5, the device may include a determiner 501, a detector 502, a query 503, and a display 504, as follows:

(1) Determiner 501:

The determiner 501 is configured to determine whether the timer has expired.

For example, the determiner 501 includes three sub determiners, which are respectively configured to determine whether the first timer, the second timer, and the third timer have expired. When the user equipment switches the MCG cell and releases the SCG bearer, the first timer is started, and the sub determiner 1 is used to determine whether the first timer has expired. After determining that the first timer has expired, the RRC is in an idle state, and after starting the second timer, the sub determiner 2 is configured to determine whether the second timer has expired. After determining that the second timer has expired, the RRC is in an idle state, and after starting the third timer, the sub determiner 3 is configured to determine whether the third timer has expired.

(2) Detector 502

The detector 502 is configured to detect the state of the RRC.

For example, after the determiner 501 determines that the first timer T1 expires, the detector 502 detects the state of the RRC, and detects whether the RRC is in the connected state or the idle state at this case. After the determiner 501 determines that the second timer expires, the detector 502 detects the state of the RRC at this case and detects whether the RRC is in a connected state or an idle state.

(3) Query 503

The query 503 is configured to query the number of data radio bearers and query the information database of the 5G cell.

For example, the query 503 includes two query subunits. The query subunit 1 is configured to query the number of DRBs when determining that the second timer has expired and the RRC is in a connected state and display the type of the signal according to the number of DRBs. The query subunit 2 is configured to query the information database of the 5G cell and display the signal type according to the 5G cell information when determining that the second timer has expired and the RRC is in an idle state.

(4) Display 504

The display 504 is configured to display the type of the signal.

For example, in a dual-connectivity network, when the user equipment switches MCG cells and releases the SCG bearer, the first timer is started, and the display of the terminal equipment continues to display the 5G signal at this case. If the first timer does not expire, the display continues to display the 5G signal. When it is determined that the first timer has expired and the RRC is in an idle state, the second timer is started, and the display unit displays the 5G signal. When it is determined that the first timer has expired and the RRC is in the connected state, if the number of DRB queried is 1, the display displays the 4G signal. If the number of DRBs queried is 2, the display displays the 5G signal. If the second timer does not expire, the display continues to display the 5G signal. When it is determined that the second timer has expired and the RRC is in the connected state, if the number of DRB queried is 1, the display displays the 4G signal. If the number of DRBs queried is 2, the display unit displays the 5G signal. When it is determined that the second timer expires and the RRC is in an idle state, if the information database of the 5G cell contains a group of MIB messages of the 5G cell, the third timer is started, and the display displays the 5G signal. If the information database of the 5G cell is empty, the display displays the 4G signal. If the third timer does not expire, the display continues to display the 5G signal. It is determined that the third timer has expired, and if the number of DRBs queried is 2, the display displays the 5G signal. If the number of DRBs queried is not 2, the display displays the 4G signal.

In the embodiment of the present disclosure, when a master node is switched and a secondary cell group bearer is released in a dual-connectivity network, starting a first timer and displaying the 5G signal; when it is determined that the first timer expires and it is detected that a radio resource control is in an idle state, starting a second timer and displaying the 5G signal; when it is determined that the second timer expires and it is detected that the radio resource control is in a connected state, querying a number of at least one data radio bearer and displaying a signal type according to the number of the at least one data radio bearer; and when it is detected that the radio resource control is in the idle state, querying an information database of a 5G cell and displaying the signal type according to information of the 5G cell. Therefore, time of the timer in this solution can be adjusted flexibly, and a signal icon can be updated more efficiently and timely by using multiple timers. By determining the number of the at least one data radio bearer and the information of the 5G cell, in the continuously changing environment of the network, a smooth processing of the 5G signal can allow a user to better experience 5G.

A method and a device for realizing stable display of a 5G signal provided by the embodiments of the present disclosure have been described above in detail. Specific examples are used herein to illustrate the principles and implementations of the present disclosure. The descriptions of the above embodiments are only used to help understand the method and the core idea of the present disclosure. In addition, for those skilled in the art, according to the idea of the present disclosure, there may be changes in the specific embodiments and application scope. In conclusion, the content of this specification should not be construed as a limitation on the present disclosure.

What is claimed is:

1. A method for realizing stable display of a 5G icon, performed by a user equipment comprising:
when a master node is switched and a secondary cell group bearer is released in a dual-connectivity network, starting a first timer and displaying the 5G icon;
when it is determined that the first timer expires and it is detected that a radio resource control is in an idle state, starting a second timer and displaying the 5G icon;
when it is determined that the second timer expires and it is detected that the radio resource control is in a connected state, querying a number of at least one data radio bearer and displaying a signal type according to the number of the at least one data radio bearer; and
when it is detected that the radio resource control is in the idle state, querying an information database of a 5G cell and displaying the signal type according to information of the 5G cell;
wherein when it is detected that the radio resource control is in the idle state, the method of querying the information database of the 5G cell and displaying the signal type according to the information of the 5G cell comprises:
when it is determined that a primary cell group supports the dual-connectivity network and the information database of the 5G cell comprises a system information of a group of 5G cells, starting a third timer and displaying the 5G icon; and
when it is determined that the primary cell group supports a single-connectivity network and the information database of the 5G cell is empty, displaying a 4G signal.

2. The method for realizing stable display of the 5G icon of claim 1, wherein when the master node is switched and the secondary cell group bearer is released in the dual-connectivity network, the method of starting the first timer and displaying the 5G icon further comprises:
when it is determined that the first timer expires and it is detected that the radio resource control is in the connected state, querying the number of the at least one data radio bearer and displaying the signal type according to the number of the at least one data radio bearer.

3. The method for realizing stable display of the 5G icon of claim 2, wherein the method of querying the number of the at least one data radio bearer comprises:
the at least one data radio bearer comprising a primary cell group bearer and the secondary cell group bearer; and
a primary cell group being a 4G cell, and a secondary cell group being a 5G cell.

4. The method for realizing stable display of the 5G icon of claim 2, wherein when it is detected that the radio resource control is in the connected state, the method of querying the number of the at least one data radio bearer and displaying the signal type according to the number of data radio bearers comprises:
when the number of the at least one data radio bearer is 1, displaying a 4G signal; and
when the number of the at least one data radio bearer is 2, displaying the 5G icon.

5. The method for realizing stable display of the 5G icon of claim 1, wherein the method of starting the third timer and displaying the 5G icon comprises:
when it is determined that the third timer expires, querying the number of the at least one data radio bearer and displaying the signal type according to the number of the at least one data radio bearer.

6. The method for realizing stable display of the 5G icon of claim 5, wherein the method of querying the number of the at least one data radio bearer and displaying the signal type according to the number of the at least one data radio bearer comprises:
   when the number of the at least one data radio bearer is less than 2, displaying the 4G signal; and
   when the number of the at least one data radio bearer is 2, displaying the 5G icon.

7. The method for realizing stable display of the 5G icon of claim 1, wherein when the master node is switched and the secondary cell group bearer is released in the dual-connectivity network, the method comprises:
   when the user equipment switches a primary cell group, enabling a measurement control through a reconfiguration message of the radio resource control; and
   when it is determined that the primary cell group supports the dual-connectivity network, adding a secondary cell group through the reconfiguration message of the radio resource control.

8. The method for realizing stable display of the 5G icon of claim 7, wherein the method of adding the secondary cell group through the reconfiguration message of the radio resource control comprises:
   acquiring a system information of the secondary cell group, wherein when the system information of the secondary cell group is inconsistent with a system information stored in the information database of the 5G cell, updating the information database of the 5G cell to the system information of the secondary cell group.

9. The method for realizing stable display of the 5G icon of claim 8, wherein when the system information of the secondary cell group is inconsistent with the system information stored in the information database of the 5G cell, the method comprises:
   the system information of the secondary cell group comprising a physical cell identification and a frequency.

10. A device user equipment for realizing stable display of a 5G icon, comprising:
    a determiner configured to: when a master node is switched and a secondary cell group bearer is released in a dual-connectivity network, start a first timer, determine that the first timer expires, start a second timer, and determine that the second timer expires;
    a detector configured to: when the first timer expires, detect that a radio resource control is in an idle state and start the second timer, and when the second timer expires, detect that the radio resource control is in a connected state;
    a query configured to: when it is determined that the second timer expires and it is detected that the radio resource control is in the connected state, query a number of at least one data radio bearer, and when it is detected that the radio resource control is in the idle state, query an information database of a 5G cell; and
    a display configured to: start the first timer and display the 5G icon, start the second timer and display the 5G icon, query the number of the at least one data radio bearer and display a signal type according to the number of the at least one data radio bearer, and query the information database of the 5G cell and display the signal type according to information of the 5G cell;
    wherein the display configured to: query the information database of the 5G cell and display the signal type according to the information of the 5G cell comprises:
    when it is determined that a primary cell group supports the dual-connectivity network and the information database of the 5G cell comprises a system information of a group of 5G cells, starting a third timer and displaying the 5G icon; and
    when it is determined that the primary cell group supports a single-connectivity network and the information database of the 5G cell is empty, displaying a 4G signal.

11. The user equipment for realizing stable display of the 5G icon of claim 10, wherein the detector configured to: when the first timer expires, detect that the radio resource control is in the idle state and start the second timer further comprises:
    when it is determined that the first timer expires and it is detected that the radio resource control is in the connected state, querying the number of the at least one data radio bearer and displaying the signal type according to the number of the at least one data radio bearer.

12. The device user equipment for realizing stable display of the 5G icon of claim 11, wherein the detector configured to: detect that the radio resource control is in the connected state, query the number of the at least one data radio bearer, and display the signal type according to the number of the at least one data radio bearer further comprises:
    when the number of the at least one data radio bearer is 1, displaying a 4G signal; and
    when the number of the at least one data radio bearer is 2, displaying the 5G icon.

13. The user equipment for realizing stable display of the 5G icon of claim 11, wherein the query configured to query the number of the at least one data radio bearer comprises:
    the at least one data radio bearer comprising a primary cell group bearer and the secondary cell group bearer; and
    a primary cell group being a 4G cell, and a secondary cell group being a 5G cell.

14. The device user equipment for realizing stable display of the 5G icon of claim 11, wherein the display configured to: start the third timer and display the 5G icon further comprises:
    when it is determined that the third timer expires, querying the number of the at least one data radio bearer and displaying the signal type according to the number of the at least one data radio bearer.

15. The device user equipment for realizing stable display of the 5G icon of claim 14, wherein the display configured to: query the number of the at least one data radio bearer and display the signal type according to the number of the at least one data radio bearer comprises:
    when the number of the at least one data radio bearer is less than 2, displaying the 4G signal; and
    when the number of the at least one data radio bearer is 2, displaying the 5G icon.

16. The user equipment for realizing stable display of the 5G icon of claim 11, wherein the determiner configured for: when the master node is switched and the secondary cell group bearer is released in the dual-connectivity network, comprises:
    when the user equipment switches a primary cell group, enabling a measurement control through a reconfiguration message of the radio resource control; and
    when it is determined that the primary cell group supports the dual-connectivity network, adding a secondary cell group through the reconfiguration message of the radio resource control.

17. The user equipment for realizing stable display of the 5G icon of claim 16, wherein the determiner configured to: when it is determined that the primary cell group supports the dual-connectivity network, add the secondary cell group through the reconfiguration message of the radio resource control, comprises:
- acquiring a system information of the secondary cell group, wherein when the system information of the secondary cell group is inconsistent with a system information stored in the information database of the 5G cell, updating the information database of the 5G cell to the system information of the secondary cell group.

18. The device user equipment for realizing stable display of the 5G icon of claim 17, wherein the determiner configured to acquire the system information of the secondary cell group comprises:
- the system information of the secondary cell group comprising a physical cell identification and a frequency.

19. A method for realizing stable display of a 5G icon, performed by a user equipment, comprising:
- when a master node is switched and a secondary cell group bearer is released in a dual-connectivity network, starting a first timer and displaying the 5G icon;
- when it is determined that the first timer expires and it is detected that a radio resource control is in an idle state, starting a second timer and displaying the 5G icon;
- when it is determined that the second timer expires and it is detected that the radio resource control is in a connected state, querying a number of at least one data radio bearer and displaying a signal type according to the number of the at least one data radio bearer; and
- when it is detected that the radio resource control is in the idle state, querying an information database of a 5G cell and displaying the signal type according to information of the 5G cell;
- wherein when the master node is switched and the secondary cell group bearer is released in the dual-connectivity network, the method comprises:
- when the user equipment switches a primary cell group, enabling a measurement control through a reconfiguration message of the radio resource control; and
- when it is determined that the primary cell group supports the dual-connectivity network, adding a secondary cell group through the reconfiguration message of the radio resource control.

20. The method for realizing stable display of the 5G icon of claim 19, wherein the method of adding the secondary cell group through the reconfiguration message of the radio resource control comprises:
- acquiring a system information of the secondary cell group, wherein when the system information of the secondary cell group is inconsistent with a system information stored in the information database of the 5G cell, updating the information database of the 5G cell to the system information of the secondary cell group.

* * * * *